United States Patent
Kris et al.

(10) Patent No.: US 11,651,509 B2
(45) Date of Patent: May 16, 2023

(54) METHOD, SYSTEM AND COMPUTER PROGRAM PRODUCT FOR 3D-NAND CDSEM METROLOGY

(71) Applicant: APPLIED MATERIALS ISRAEL LTD., Rehovot (IL)

(72) Inventors: Roman Kris, Jerusalem (IL); Roi Meir, Ganei Tikva (IL); Sahar Levin, Or-Yehuda (IL); Ishai Schwarzband, Or-Yehuda (IL); Grigory Klebanov, Rishon-LeZion (IL); Shimon Levi, Kiryat-Tivon (IL); Efrat Noifeld, Nes Ziona (IL); Hiroshi Miroku, Mie (JP); Taku Yoshizawa, Mie (JP); Kasturi Saha, Bangalore (IN); Sharon Duvdevani-Bar, Mazkeret-Batya (IL); Vadim Vereschagin, Ashdod (IL)

(73) Assignee: Applied Materials Israel Ltd., Rehovot (IL)

( * ) Notice: Subject to any disclaimer, the term of this patent is extended or adjusted under 35 U.S.C. 154(b) by 176 days.

(21) Appl. No.: 17/281,948

(22) PCT Filed: Oct. 31, 2019

(86) PCT No.: PCT/IL2019/051188
§ 371 (c)(1),
(2) Date: Mar. 31, 2021

(87) PCT Pub. No.: WO2020/089910
PCT Pub. Date: May 7, 2020

(65) Prior Publication Data
US 2021/0383529 A1    Dec. 9, 2021

Related U.S. Application Data
(60) Provisional application No. 62/755,155, filed on Nov. 2, 2018.

(51) Int. Cl.
*G06T 7/00* (2017.01)
*G06T 7/13* (2017.01)
(Continued)

(52) U.S. Cl.
CPC ......... *G06T 7/0004* (2013.01); *G01N 23/225* (2013.01); *G06T 7/13* (2017.01);
(Continued)

(58) Field of Classification Search
CPC ............ G01N 23/225; G01N 2223/401; G06T 7/0004; G06T 7/13; G06T 7/194;
(Continued)

(56) References Cited

U.S. PATENT DOCUMENTS 4,752,898 A * 6/1988 Koenig ............. H01L 21/67796
414/754
9,165,376 B2   10/2015 Schwartzband et al.
(Continued)

FOREIGN PATENT DOCUMENTS

CN      1787200 A  *  6/2006
CN    101788503 B  *  7/2012
(Continued)

OTHER PUBLICATIONS

Reuter et al. ("Application of a new laser scanning pattern wafer inspection tool to leading edge memory and logic applications at Infineon Technologies," 10th Annual IEEE/SEMI. Advanced Semiconductor Manufacturing Conference and Workshop. Date of Conference: Sep. 8-10, 1999) (Year: 1999).*
(Continued)

*Primary Examiner* — Yubin Hung
(74) *Attorney, Agent, or Firm* — Lowenstein Sandler LLP

(57) ABSTRACT

A method for process control of a semiconductor structure fabricated by a series of fabrication steps, the method comprising obtaining an image of the semiconductor struc-
(Continued)

ture indicative of at least two individual fabrication steps; wherein the image is generated by scanning the semiconductor structure with a charged particle beam and collecting signals emanating from the semiconductor structure; and processing, by a hardware processor, the image to determining a parameter of the semiconductor structure, wherein processing includes measuring step/s from among the fabrication steps as an individual feature.

11 Claims, 7 Drawing Sheets

(51) Int. Cl.
*G06T 7/194* (2017.01)
*G06T 7/60* (2017.01)
*G06V 10/44* (2022.01)
*G06V 20/69* (2022.01)
*G01N 23/225* (2018.01)

(52) U.S. Cl.
CPC .............. *G06T 7/194* (2017.01); *G06T 7/60* (2013.01); *G06V 10/44* (2022.01); *G06V 20/695* (2022.01); *G01N 2223/401* (2013.01); *G06T 2207/10061* (2013.01); *G06T 2207/30148* (2013.01)

(58) Field of Classification Search
CPC ............. G06T 7/60; G06T 2207/10061; G06T 2207/30148; G06V 10/44; G06V 20/695
See application file for complete search history.

(56) References Cited

U.S. PATENT DOCUMENTS

| | | | |
|---|---|---|---|
| 9,552,531 B2 | 1/2017 | Usikov | |
| 9,653,311 B1 | 5/2017 | Ahn et al. | |
| 2003/0095710 A1* | 5/2003 | Tessadro | G06T 7/12 |
| | | | 382/199 |
| 2006/0115142 A1* | 6/2006 | Sim | G06T 7/001 |
| | | | 382/145 |
| 2008/0121880 A1 | 5/2008 | Park | |
| 2010/0158345 A1 | 6/2010 | Kitamura et al. | |
| 2012/0267528 A1 | 10/2012 | Sakai et al. | |
| 2013/0094768 A1* | 4/2013 | Ye | G06T 7/12 |
| | | | 382/199 |
| 2014/0063570 A1* | 3/2014 | Kaempflein | H04N 1/00748 |
| | | | 358/488 |
| 2017/0352100 A1* | 12/2017 | Shreve | G06V 20/10 |
| 2018/0197732 A1 | 7/2018 | Oh et al. | |

FOREIGN PATENT DOCUMENTS

| | | | |
|---|---|---|---|
| JP | 2011133378 A | 7/2011 | |
| TW | 201305531 A | 2/2013 | |
| TW | 201703096 A | 1/2017 | |
| WO | WO-2006028434 A2 * | 3/2006 | G06K 9/00624 |

OTHER PUBLICATIONS

First Office Action for Chinese Application No. 201980049495.8, dated Dec. 15, 2021, 12 pages.
International Search Report and Written Opinion dated Mar. 18, 2020, on application No. PCT/IL2019/051188, 9 pages.
Postek, et al., "Scanning electron microscope metrology: harder than you might think", SPIE, Sep. 4, 2013, accessed at https://spie.org/news/5083-scanning-electron-microscope-metrology-harder-than-you-might-think?SSO=1, 3 pages.
Su, et al., "Introduction to Metrology Applications in IC Manufacturing", SPIE, 2015, 182 pages, SPIE Press, Bellingham, Washington, USA, accessed on Sep. 2, 2021 at https://www.spiedigitallibrary.org/ebooks/.
Geng, et al., "How Semiconductor Chips are Made", Semiconductor Manufacturing Handbook, Chapter 1, 2005, 10 pages.
Soille, P. "Morphological image analysis: principles and applications" Springer Science & Business Media, 2004, 15 pages.
Peltinov, et al., "CD Metrology and CD-Sem", Semiconductor Manufacturing Handbook, 2005, https://www.globalspec.com/reference/76679/203279/chapter-33-cd-metrology-and-cd-sem, 18 pages.
Lapedus, Mark, "3D NAND Metrology Challenges Growing", Apr. 9, 2019, https://semiengineering.com/3d-nand-metrology-challenges-growing/, 7 pages.
Orji et al., "Metrology for the next generation of semiconductor devices." Nature electronics 1.10 (Oct. 12, 2018), pp. 532-547.
Lapedus, Mark, "Gaps in Metrology Could Impact Yield", Apr. 17, 2014. https://semiengineering.com/gaps-in-metrology-could-impact-yield/, 3 pages.
Meseguer, et al., "Local Search Algorithm", Science Direct, 2006, https://www.sciencedirect.com/topics/computer-science/local-search-algorithm, 16 pages.
Vainberg, Y. A. M., "Application of Markov Chains to The Problem of Separation of Holes Section," or "Use of Markov chains in the problem of separation of a borehole section," Sov. Geol. Geophys, 1980, 21(2), 94-102, English abstract only (Best copy available).

* cited by examiner

Synthetic image

METHOD, SYSTEM AND COMPUTER PROGRAM PRODUCT FOR 3D-NAND CDSEM METROLOGY

REFERENCE TO CO-PENDING APPLICATIONS

Priority is claimed from U.S. Provisional Patent Application No. 62/755,155 entitled "3D-NAND STAIRCASE CD SEM METROLOGY" filed Nov. 2, 2018, the disclosure of which application/s is hereby incorporated by reference.

TECHNICAL FIELD

The presently disclosed subject matter relates, in general, to the field of metrology and more specification to examination of a microscopic structure, and methods and systems for automating such examination.

BACKGROUND

3D NAND flash is a type of flash memory in which the memory cells are stacked vertically in multiple layers.

A Critical Dimension Scanning Electron Microscope (also known as CDSEM) measures dimensions of fine patterns formed on a semiconductor wafer, and is mainly used for process control—controlling manufacturing lines of electronic devices of semiconductors.

Critical dimension measurement may be performed to support wafer fabrication e.g.

1. Critical dimension measurement of photoresist pattern before or after development
2. Measurement of the contact hole diameter/via-hole diameter and the wiring width after etching.

SUMMARY OF CERTAIN EMBODIMENTS

As the semiconductor industry is moving toward the manufacturing of three-dimensional structures, there is a growing need for the development of new approaches in CD Metrology. For example, there is a need to adapt commonly used metrology algorithms to better fit the analysis of CD images of three-dimensional structures.

In accordance with certain aspects of the presently disclosed subject matter, there is provided an improved method of examination of a semiconductor specimen.

In accordance with other aspects of the presently disclosed subject matter, there is provided a system usable for examination of a semiconductor specimen in accordance with the method above.

In accordance with other aspects of the presently disclosed subject matter, there is provided a non-transitory computer readable medium comprising instructions that, when executed by a computer, cause the computer to perform the method above.

There is thus provided at least the following embodiments:

Embodiment 1: A method and/or system and/or computer program product, for process control of a semiconductor structure typically fabricated by plural e.g. a series of fabrication steps (e.g. staircase, VNAND), typically comprising obtaining an image of the semiconductor structure indicative of at least two individual fabrication steps. The image may be generated by scanning the semiconductor structure e.g. with a charged particle beam and signals emanating from the semiconductor structure may be collected. The image may be processed including determining a parameter of the semiconductor structure. The processing typically includes measuring one or more steps from among the at least two individual fabrication steps e.g. as an individual feature.

A predefined number of steps to be determined in an image may be received. The number of such steps may be set empirically e.g. during a measurement setup phase.

A method and/or system and/or computer program product, e.g. the above method and/or system and/or computer program product, may be operative in conjunction with a scanning electron microscope (aka SEM), and/or a metrology algorithm which may be operative to receive a SEM image, or charged-particle image, e.g. of a portion of a semi-conductor structure or device which may bear a pattern and may, responsively, measure at least one parameter of the pattern. The pattern typically comprises at least one line in the device. The parameter typically comprises at least one dimension of the at least one line. The system may comprise at least one processor configured for performing metrology on a semi-conductor structure or device. The metrology may comprise a. receiving at least one SEM image, generated by the SEM, of the device, and/or b. image-processing the SEM image, thereby to generate an image-processed algorithm input; and/or c. running a metrology algorithm operative to receive input I and/or, typically responsively, to measure at least one dimension of at least one line. The input I may comprise the image-processed algorithm input rather than a SEM image of a portion of a semi-conductor structure or device.

It is appreciated that SEMs yielding SEM images, may be used in any embodiments herein, or more generally charged particle microscopies may be used, yielding charged particle images.

Embodiment 2. The method and/or system and/or computer program product of any preceding embodiment e.g. of Embodiment 1 and wherein the semiconductor structure or device comprises a 3D, or VNAND semiconductor structure or device including a staircase having plural steps and contacts under the staircase), the image including at least a portion of the staircase.

It is appreciated that SEMs have a depth limitation thus each SEM image typically includes far less than the plural number of steps in the entire staircase.

Embodiment 3. The method and/or system and/or computer program product of any preceding embodiment e.g. of Embodiment 2 wherein the at least one dimension includes at least one dimension of at least one step in the staircase, the dimension including step length.

Embodiment 4. The method and/or system and/or computer program product of any preceding embodiment e.g. of Embodiment 1 wherein the method is performed for at least one multi-layer device for which, previously, the metrology algorithm failed to perform.

Embodiment 5. The method and/or system and/or computer program product of any preceding embodiment e.g. of Embodiment 2 wherein, typically, each individual step from among the plural steps is measured separately, or as a separate feature or individual feature, typically including:

(a) detecting the individual step assuming the staircase has a predefined number of steps. This detection may include finding a Coarse Edge, typically yielding-contour defining step location with accuracy of step width, and/or (b). finding a "line" in a predetermined location, within the individual step (e.g. contour defining step location). The "line" typically comprises a contour located in the vicinity of the step. The contour can be located from the leftmost to rightmost portions of the step, without affecting finding of fine contours as described herein, and/or (c). measuring the individual step relative to the line in the predetermined location e.g. defining fine contours. Typically, this yields leftmost and rightmost portions of the step, which may then be used for CD Results estimation. Typically, this step measuring operation includes estimation of distance between a portion (e.g. leftmost or rightmost portion) of any step to another step, using parameters which may be user-defined, via GUI Measurement parameters. Typically, in VNAND metrology, distances between each step's leftmost portion to the leftmost portion of the first (leftmost) step in the target, are measured.

Thus, it is appreciated that the line in a predetermined location within the individual step may, just by way of example, comprise the leftmost (or rightmost) line in the individual step.

The number of steps may be predefined empirically, during a measurement setup phase.

Embodiment 6. The method and/or system and/or computer program product of any preceding embodiment e.g. of Embodiment 1 wherein the metrology algorithm comprises a LEA algorithm.

Embodiment 7. The method and/or system and/or computer program product of any preceding embodiment e.g. of Embodiment 2 wherein the metrology algorithm is run on some, but not all, of the plural steps.

Embodiment 8. A method operative in conjunction with:

a scanning electron microscope (aka SEM), and/or a metrology algorithm operative to receive a SEM image or charged-particle image of a portion of a semi-conductor structure which may bear a pattern and, responsively, to measure at least one parameter of the pattern wherein the pattern comprises at least one line in the device and the parameter comprises at least one dimension of the at least one line, the system comprising at least one processor configured for performing metrology on a semi-conductor structure or device, the metrology comprising all or any subset of the following operations, suitably ordered e.g. as follows:

a. receiving at least one SEM image, generated by the SEM of the device, b. image—processing the SEM image, thereby to generate an image-processed algorithm input; and c. running a metrology algorithm operative to receive input I, and, responsively, to measure at least one dimension of at least one line, and wherein the input I comprises the image-processed algorithm input rather than a SEM image of a portion of a semi-conductor structure or device.

Embodiment 9. The method and/or system and/or computer program product of any preceding embodiment e.g. of Embodiment 1 wherein the semi-conductor structure or device bears a pattern having alternating layers of lines and contacts and wherein the image-processing includes identifying at least one portion of at least one contact from among the contacts, in at least one SEM image which also includes lines, and masking the contacts by image processing the SEM image, thereby to generate the pre-processed algorithm input.

Any suitable method may be used to identify contacts or portions thereof, such as a HOUGH transform.

Embodiment 10. The method and/or system and/or computer program product of any preceding embodiment e.g. of Embodiment 9 and wherein the masking yields a contacts mask and wherein gray level values selected from a distribution which preserves image statistics, are assigned to pixels inside the mask, thereby to generate the pre-processed algorithm input.

Embodiment 11. The method and/or system and/or computer program product of any preceding embodiment e.g. of Embodiment 2 wherein the image processing includes identifying at least one step from among the plural steps, by image processing the SEM image of the image including at least the portion of the staircase, and parameterizing the metrology algorithm such that the metrology algorithm treats the step as a line.

Embodiment 12. The method and/or system and/or computer program product of any preceding embodiment e.g. of Embodiment 1 wherein the image-processing includes modifying the step including converting the step into a linear curve, by smoothing the step.

Typically, a single microscope is used for generation of SEM images of portions of the device to be used for metrology and subsequent process control, throughout the fabrication process of a device, including all phases of R&D fabrication and including production fabrication.

Embodiment 13. The method and/or system and/or computer program product of any preceding embodiment e.g. of Embodiment 4 and also comprising process control for fabrication of at least one layer of the multi-layer device, responsive to the dimensions.

Embodiment 14. The method and/or system and/or computer program product of any preceding embodiment e.g. of Embodiment 13 wherein the process control is responsive to L outputs generated by L metrology algorithm runs respectively, the runs measuring lines in each of L layers of the device respectively and wherein a single metrology algorithm is run L times to generate the L algorithm outputs respectively.

For a chipmaker, use of a single algorithm rather than selecting one of several available algorithms, is an advantage since it yields simplicity.

The input to each run of the L metrology algorithm typically includes one or more SEM images each of at least a portion of at least one of the L layers of the device, and at least one parameter provided by a chipmaker end-user via a GUI.

Embodiment 15. The method and/or system and/or computer program product of any preceding embodiment e.g. of Embodiment 8 and also comprising using a GUI to generate at least one recipe setup defining at least one physical aspect of dimension metrology, before runtime in which the metrology algorithm is run.

Embodiment 16. The method and/or system and/or computer program product of any preceding embodiment e.g. of Embodiment 15 wherein plural recipe setups are generated for plural respective wafer fields including generating a first recipe setup for a first (aka "central") wafer field and generating subsequent recipe setups for fields in the wafer other than the first field, which are modifications of the first recipe setup.

Embodiment 17. The method and/or system and/or computer program product of any preceding embodiment e.g. of Embodiment 8 wherein the method is performed plural times, unconditionally, e.g. without checking whether or not all fields, within a given wafer, have an identical number of lines.

Embodiment 18. The method and/or system and/or computer program product of any preceding embodiment e.g. of Embodiment 8 wherein the method is performed only if at least one assumption regarding the device on which metrology is being performed, is pre-checked and found to be false.

Embodiment 19. The method and/or system and/or computer program product of any preceding embodiment e.g. of Embodiment 18 wherein the at least one assumption includes an assumption that all SEM fields of view, of or within a given wafer, have an identical number of lines.

Embodiment 20. The method and/or system and/or computer program product of any preceding embodiment e.g. of Embodiment 18 wherein the at least one assumption includes an assumption that all SEM fields of view, of or within a given wafer, include either lines or contacts, but not both.

Embodiment 21. A non-transitory computer-readable medium comprising instructions that, when executed by a computer, cause the computer to perform the method and/or system and/or computer program product of any preceding embodiment e.g. of Embodiment 8.

Embodiment 22. The method and/or system and/or computer program product of any preceding embodiment e.g. of Embodiment 1 and also including generating an initial estimate of at least one line, by selecting from among plural equally wide strips each having a center-line and respectively including respective numbers of points, an individual strip whose number of points is greatest from among the respective numbers of points, and setting the initial estimate as the center-line of the individual strip.

Embodiment B9. A system, connectable to or hosted by a Charged Particle Microscope (CPM), for process control of a semiconductor structure fabricated by a series of fabrication steps, comprising:
a memory; and
a processor, operatively coupled with the memory, to:
  receive an image of the semiconductor structure indicative of at least two individual fabrication steps; wherein the image is obtained by the CPM and generated by scanning the semiconductor structure with a charged particle beam and collecting signals emanating from the semiconductor structure; and
  process the image to determining a parameter of the semiconductor structure, by measuring one or more steps from among the at least two individual fabrication steps as an individual feature.

Embodiment B10. The system of any preceding embodiment e.g. of Embodiment b09 wherein the processor is further configured to detect a step and transform the step into a line. Embodiment B11. The system of any preceding embodiment e.g. of Embodiment b-10 wherein the processor is further to detect a step by, for each of the one or more steps, obtaining a maximal edge width parameter, wherein the maximal edge width parameter is indicative of boundaries of said step.

Embodiment B12. The system of any preceding embodiment e.g. of Embodiment b-11 wherein said transforming the step into a line comprises defining, for each of the one or more steps, a pair of coarse edges and a pair of fine edges, and wherein said processing the image to determining a parameter of the semiconductor structure comprises using said pair of coarse edges and a pair of fine edges.

Embodiment B13. The system of any preceding embodiment e.g. of Embodiment b-11 wherein the maximal edge width parameter is approximately equal half of a minimal distance between a coarse edge of a step and a coarse step of another, e.g. a nearing or nearest or adjacent, step.

Embodiment B14. The system of any preceding embodiment e.g. of Embodiment b010 wherein the processor is further to select a predetermined number of steps; set a coarse edge of one of the steps as anchor location; and measure parameters of other steps relative to the anchor location.

Embodiment B15. The system of any preceding embodiment e.g. of Embodiment b-9 wherein the processor is further to mask contacts by (1) segmenting the image to create contacts and (2) associating the contacts with grey level values representative of image background.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 1b is an example diagram useful in understanding the flow of FIG. 1a.

FIG. 2b is an example diagram useful in understanding the flow of FIG. 2a.

FIGS. 5a-5b illustrate contacts mask creation (FIG. 5a), and mask application (FIG. 5b) thereby to facilitate detection of line edges in a 3D structure e.g. a staircase is typically successful, despite the contacts environment, in accordance with certain embodiments of the presently disclosed subject matter;

Figure 1B:
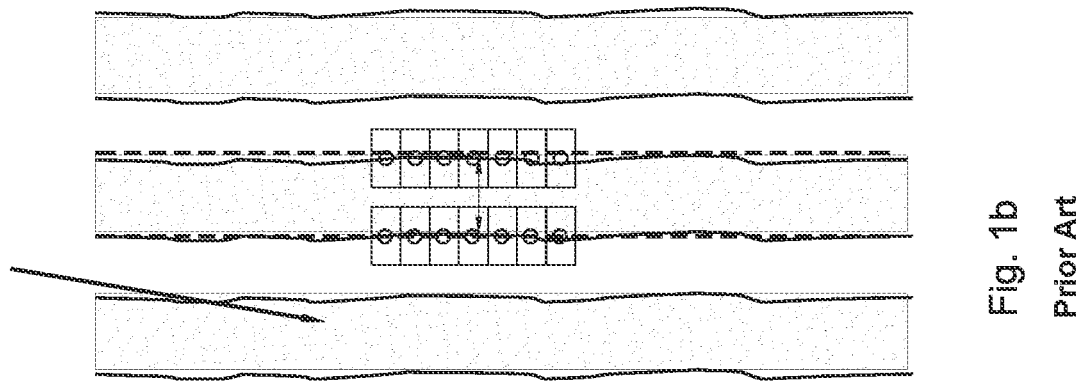

Methods and systems included in the scope of the present invention may include some (e.g. any suitable subset) or all of the functional blocks shown in the specifically illustrated implementations by way of example, in any suitable order e.g. as shown. Features of the present invention, including operations, which are described in the context of separate embodiments may also be provided in combination in a single embodiment. For example, a system embodiment is intended to include a corresponding process embodiment and vice versa. Features may also be combined with features known in the art and particularly although not limited to those described in the Background section or in publications mentioned therein.

It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

DETAILED DESCRIPTION OF EMBODIMENTS

Certain embodiments of the presently disclosed subject matter seek to provide an improved CD SEM Metrology method suitable for dimension, e.g. critical dimension (CD), measurement of, inter alia, 3D-NAND Staircase processes, while preserving precision and robustness.

Conventional CD SEM metrology uses certain known CD Line Edge Analysis Algorithms (LEA) for 3D-NAND Staircase process control. CD line edge analysis algorithms used in conventional CD SEM metrology for 3D-NAND Staircase process control are based on certain assumptions, e.g.:
1. Number of features is the same in all targets in the recipe run.
2. Only the lines produced by SEM Signal are observed in the field of view, or, only features of a certain shape, e.g. only lines, or only contacts, are present in the field of view.

These algorithms were developed under these assumptions, however these assumptions do not necessarily characterize certain user cases e.g. certain 3D-NAND staircase formation process steps. For example, at the farther peripheral area of the staircase, the contact pattern may be visible in the CD SEM image, in contrast to the conventional assumptions.

Certain embodiments of the presently disclosed subject matter seek to revise these algorithms for situations in which:
a. the number of features is changed (as opposed to conventional CD SEM metrology in which it is assumed that the number of features is the same in all targets in the recipe run) and the different geometric shapes in the field of view should be analyzed,
and/or
b. the three dimensional contacts structures (not only the lines produced by the SEM Signal, as is assumed in conventional CD SEM metrology), may be observable in the field of view.

According to certain embodiments, from among CD SEM measurements taken by a CD SEM metrology tool/system, measurements relating selected areas and locations, for example, the leftmost lines in the 3D Steps in 3D-NAND structure, is used. Distances between the lines are an example of a possible measurement.

In these measurements:
(a) each step could consist of arbitrary number of lines; and/or
(b) contacts could be observed in the field of view.

The variable number of lines inside of each Staircase step is one problem, aka problem1, which may be resolved by certain embodiments herein.

According to certain embodiments, each Staircase step is considered as a separate feature or individual feature and is measured by:
operation 1-I. Detect 3D Steps assuming that number of 3D Steps in the Staircase target is known; and/or
operation 1-II. Determine the most left line in each 3D Step and use it for the measurement.

Line detection in the contacts environment is also one problem, aka problem2, which may be resolved by certain embodiments herein.

According to certain embodiments, the method eliminates the signal from contacts layers and then may use conventional LEA algorithms.

The method may for example include all or any subset of the following operations, suitably ordered e.g. as follows:
Operation 2-I. Create contacts mask e.g. by segmentation algorithm.
Operation 2-II. Assign to the pixels inside of mask the random grey level values preserving image background statistics.
Operation 2-III. Use the current LEA algorithm for measurement.

According to certain embodiments, system logic is configured such that operations 1-I and/or 1-II are performed only if problem1 is detected or known or estimated (by system or by operator) to be applicable, and operations 2-I and/or 2-II and/or 2-III are performed only if problem1 is detected or known or estimated (by system or by operator) to be applicable.

According to other embodiments, system logic to perform operations 1-I and/or 1-II and/or operations 2-I and/or 2-II and/or 2-III regardless of whether problem1 and/or problem2 is or are detected or known or estimated to be applicable.

Embodiments herein are advantageous inter alia because measurement of a VNAND Staircase target using conventional algorithms typically results in failure e.g. in wrong line detection e.g. due to contacts' layer signal.

Certain embodiments may be implemented on-tool. For example, the embodiments may be implemented on the image processing of a CD SEM measurement tool e.g. as a set of instructions stored on the memory unit of the CD SEM measurement tool. The instruction set may be read by a measurement image processing unit adapted for executing these instructions while integrating execution of the instructions in the overall image processing.

Alternatively, embodiments may be implemented on hardware separate from but communicating with the CD SEM measurement tool or system.

The revised or improved algorithm may include all or any subset of the following, suitably ordered e.g. as follows: 1. Contacts mask creation, 2. Mask applying, and 3. Edge detection.

This method may be advantageous e.g. because the method yields successful staircase target line edge detection in the contacts environment.

Typically, at least one dimension as measured deviates from a desired nominal value defined for the dimension and process control comprises adjusting at least one parameter controlling the fabrication process responsively, thereby to cause the dimension to deviate less from the desired nominal value, or not at all.

The following terms may be construed either in accordance with any definition thereof appearing in the prior art literature or in accordance with the specification, or to include in their respective scopes, the following:

SEM image—may include gray levels generated by the SEM's detector.

Segmentation: may include using image processing to identify, say, contacts in a SEM image of a staircase Edge: may include a linear segment interconnecting a first portion of a step at height z1 and a second portion of the step at height z2 which differs from z1.

Line: may include a linear segment interconnecting 2 edges.

Linear trend: in a metrology system, a received input signal may exhibit a linear trend, noise and outliers (e.g. F=input signal=linear trend ax+b+noise+outliers), and it may be desired to determine and generate an output indication of the slope a and free coefficient b for the linear trend or best-fit line.

Contacts mask is intended to include an etching mask used to produce flash memory contacts.

Target is intended to include a portion of an image generated by an SEM, depicting a feature to be measured e.g. in e.g. a staircase with steps.

Feature: It is appreciated that features (e.g. devices) may be of any shape, e.g. lines, or contacts, or entire structures such as steps or staircases.

Staircase is intended to include structures in 3D NAND flash memories in which memory cells are vertically stacked to form plural layers.

In accordance with certain aspects of the presently disclosed subject matter, Welsh robust fitting is used.

Welsh robust fitting, typically including a robust multi-linear regression of responses in y on predictors in X used to estimate a straight-line fit of y to x, is known.

In a genetic algorithm, a population of candidate solutions to an optimization problem aka individuals, creatures, or phenotypes) is evolved. Each candidate solution is an array of bits=strings of 0s and 1s, and the candidate solution has a set of properties (aka chromosomes or genotype) which can be mutated and altered;
evolution: start from a population of randomly generated individuals=1$^{st}$ generation iterative process, with the population in each iteration called a generation;
In each generation, the fitness of every individual in the population is evaluated;
fitness=of objective function.

The more fit individuals are stochastically selected from the current population, each individual's genome is modified (recombined and possibly randomly mutated) to form a new generation.

The new generation of candidate solutions is then used in the next iteration of the algorithm.

The algorithm terminates when either a maximum number of generations has been produced, or a satisfactory fitness level has been reached for the population.

An examination process can include runtime scanning (in a single or in multiple scans), sampling, reviewing, measuring, classifying and/or other operations provided with regard to the specimen or parts thereof using the same or different examination tools. Likewise, at least some examination can be carried out prior to manufacture of the specimen to be examined, and can include, for example, generating an examination recipe(s), training respective classifiers or other machine learning-related tools and/or other setup operations. It is noted that, unless specifically stated otherwise, the term "examination" or its derivatives used in this specification, is not limited with respect to resolution or to the size of an inspection area. A variety of non-destructive examination tools includes, by way of non-limiting example, scanning electron microscopes, atomic force microscopes, optical inspection tools, etc. By way of non-limiting example, runtime examination can employ a two phase procedure, e.g. inspection of a specimen followed by review of sampled locations of potential defects. During the first phase, the surface of a specimen is inspected at high-speed and relatively low-resolution. In the first phase, a defect map is produced to show locations on the specimen suspected of having high probability of a defect. During the second phase, at least some of such suspected locations are more thoroughly analyzed with relatively high resolution.

Figure 2B:
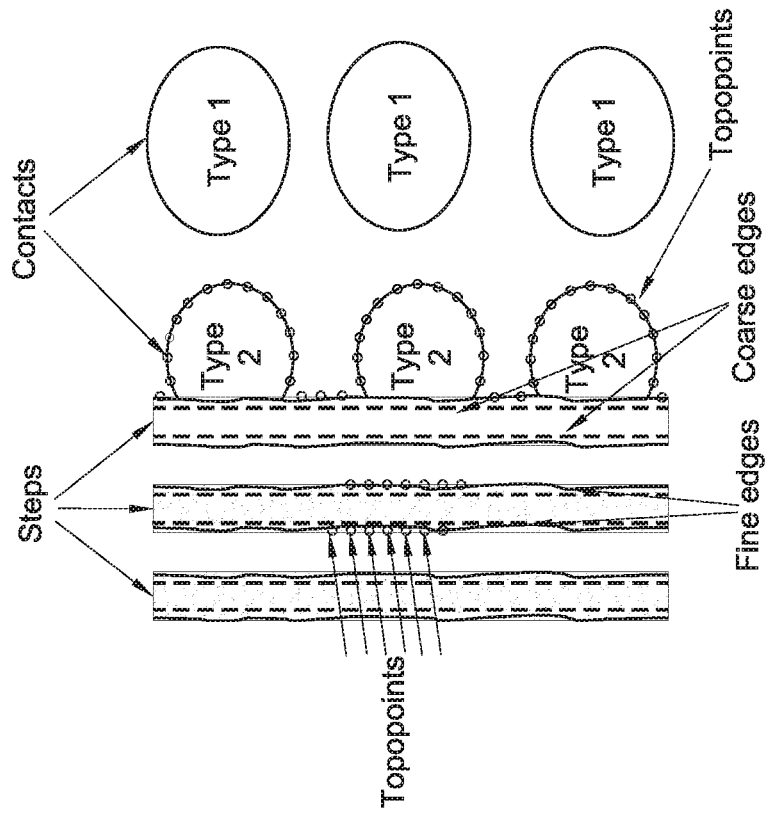

Integrated circuit device metrology, of IC devices, structures or features including high-aspect-ratio features, is useful in devices' research and development, integration, manufacturing process control and testing. Improved metrology is now described, however, firstly, FIG. 1b is presented which illustrates a conventional line detection measurement flow aka "flow D" which may include, suitably ordered e.g. as shown, all or any subset of the following operations: scan, line detect, contour detect, linear fit, and CD results. A conventional 3D CD SEM metrology system may be used to perform these operations, e.g. for scanning, use the system's "Scan for Measurement" operation or function; for Line detection (constant number of lines) the system's "Coarse Edge" operation or function may be used; for Fine contour detection, the system's "Fine Edge or Topopoints estimation" operation or function may be used (note fine edges are indicated in FIG. 2b by solid lines whereas coarse edges are indicated by dashed lines); for Linear fit, the system's "part of CD results" operation or function may be used; and for CD results, the system's "CD results" operation or function may be used.

The linear fit operation may employ a suitable LEA algorithm, e.g. as known in the art.

Figure 1A:
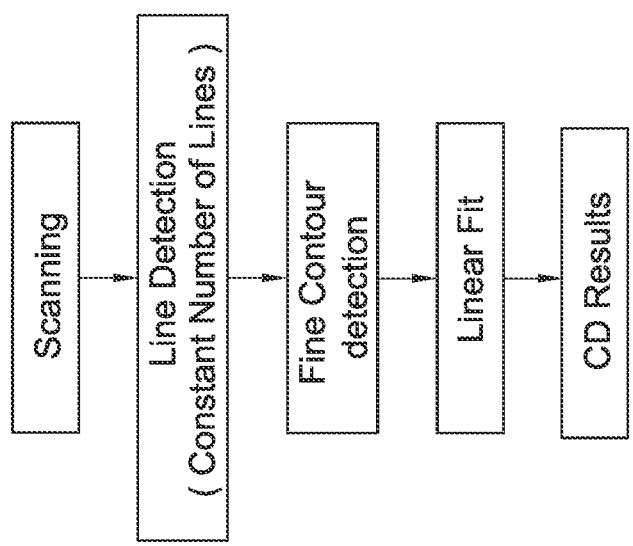
FIGS. 1a and 2a are flows, all or any subset of whose operations may be provided in any suitable order e.g. as shown, provided in accordance with certain embodiments of the presently disclosed subject matter.
Figure 2A:
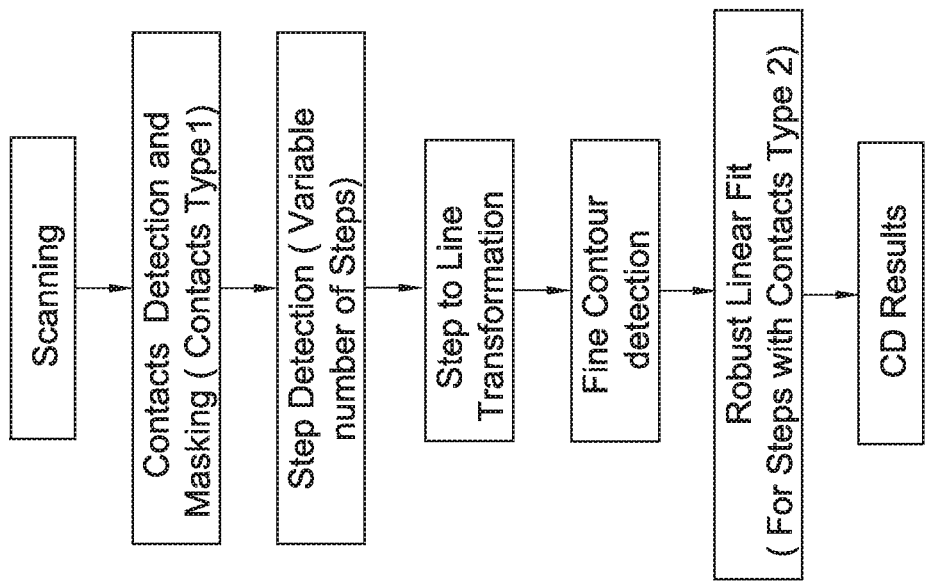

A method, e.g. as shown in FIG. 2a, is now described, which uses a conventional algorithm such as the method of FIG. 1a, not designed to measure VNAND devices such as 3D-NAND staircases, to measure these VNAND devices, facilitated by suitable prior image-processing e.g. as described.

Typically, Line detection algorithms (e.g. as described in FIG. 1a herein or as known in the art), assume that a Line, as a physical object, has two edges (which are also physical objects), and each edge has one coarse edge (geometric object), detected algorithmically. Each coarse edge creates 2 FineEdges and it may be assumed that there are no internal edges inside the line. A parameter, MaximumEdgeWidth, used e.g. by the method of claim 11 in U.S. Pat. No. 9,165,376 is the assumed maximum edge width limitation (or minimal distance limitation) between the edges of a single line e.g. approximately equals half of the line width.

However, for Steps having internal structure, customization of the conventional line detection algorithm is provided, e.g. as follows: define the Step as the target for the Line detection algorithm and define the MaximumEdgeWidth parameter as half the Minimal Distance between Steps. This "encourages" or allows the algorithm to find only Steps (ignoring their internal structure), typically at first stage in a robust manner.

The MaximumEdgeWidth parameter, e.g. as used in conventional CD SEM metrology systems, may be used to define operation b, e.g. such that a new best path or coarse edge in each repetition, cannot be located within a vicinity, defined by the MaximumEdgeWidth parameter, of another coarse edge.

FIGS. 3a-3c, 4a-4d are useful in understanding the detection of Lines (e.g. as per FIG. 1a) and of Steps (e.g. as per FIG. 2a) including the Step to Line transformation operation d of FIG. 2a which allows line detection to be used to detect, say, 3d staircase steps.

Figure 3A:
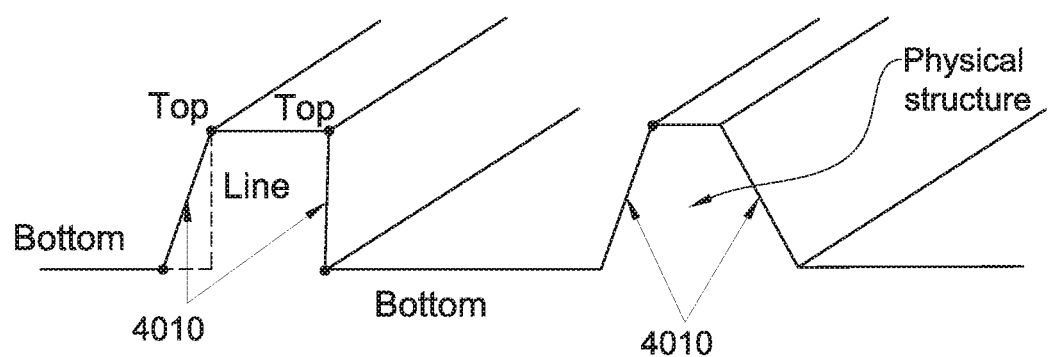
FIGS. 3a-3c, 4a-4d are useful in understanding the detection of Lines (e.g. as per FIG. 1a and of Steps e.g. as per FIG. 2a including the Step to Line transformation operation d of FIG. 2a which allows line detection to be used to detect, say, 3D staircase steps.

FIG. 3a illustrates lines, each line comprising a physical structure having edges and defining a top and a bottom as shown.

Figure 3B:
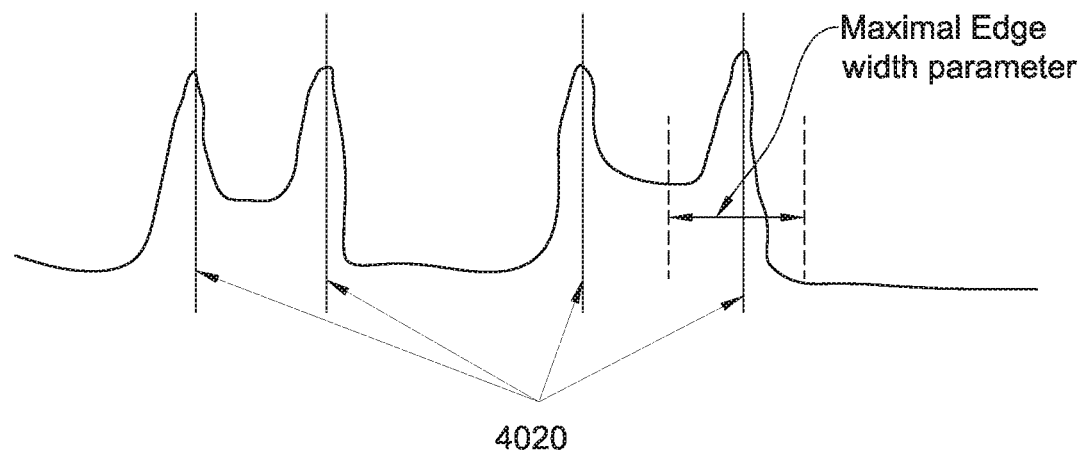

It is appreciated that one line may have two coarse edges. At least one, or each, coarse edge may comprise a physical structure which is trapezoidal in cross-section. FIG. 3b illustrates a graph of a SEM signal corresponding to the lines of FIG. 3a including coarse edges (in vicinity of real edge) as shown; note definition of the maximal edge width parameter referred to herein. A Real edge typically comprises a portion of a Line extending between Top and Bottom e.g. where the height of structure is significantly changed.

The MaximumEdgeWidth is a parameter that is defined prior to in-line metrology measurements. According to embodiments of the subject matter, the MaximumEdgeWidth parameter is defined empirically, for example, during a preliminary setup phase (the setup phase is also known as 'recipe setup phase'). According to other embodiments, the MaximumEdgeWidth parameter is defined based on wafer design information. According to other embodiments, the MaximumEdgeWidth parameter is defined in an automated or semi-automated manner, for example by measuring a parameter of the structure in a sequence of measuring operations, each associated with different values of the MaximumEdgeWidth, and selecting a preferred MaximumEdgeWidth value which is associated with a desired measuring result.

For certain operational scenarios, the following relations between the MaximumEdgeWidth parameter and other parameters associated with a step, were found:

The MaximumEdgeWidth is larger than the edge width of a line associated with a step;

The MaximumEdgeWidth is smaller than half line width

The MaximumEdgeWidth may be set as reflecting half the distance between nearest coarse edges of other e.g. nearest or adjacent or nearing, steps.

The vertical axis of the SEM graph may comprise SEM Signal intensity typically after averaging on the Y coordinate of the SEM image. The horizontal axis may be the x-SEM image coordinate.

Figure 3C:
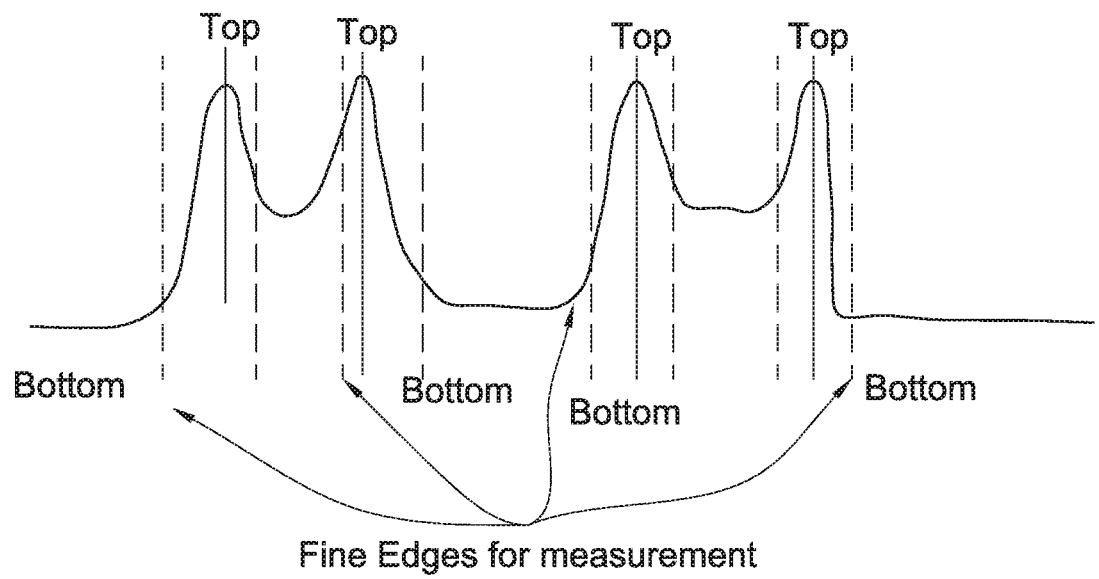

FIG. 3c shows the graph of FIG. 3b, including a line having 2 coarse edges. Each coarse edge's top surface extends between two top points as shown and each coarse edge's bottom surface (which is typically larger than the top surface) extends between two bottom points as shown.

To generate dimension metrology e.g. CD results, fine edges may be measured. Each coarse edge includes two fine edges, a top fine edge and a bottom fine edge.

Figure 4A:
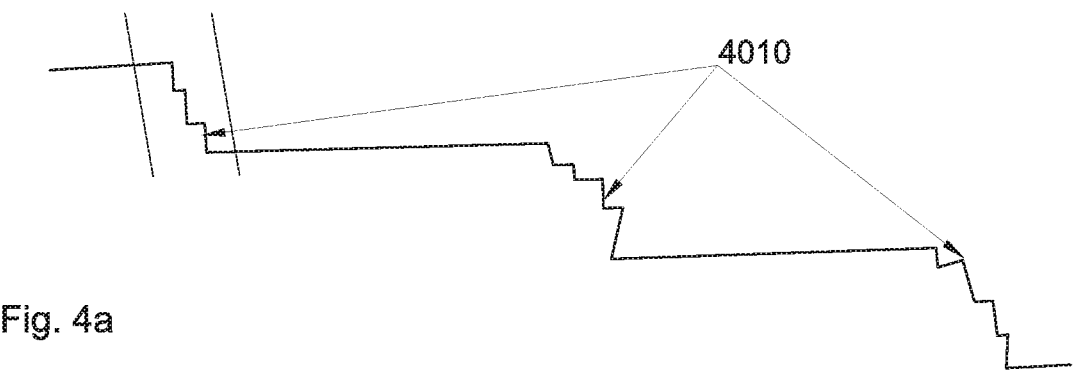

FIG. 4a illustrates pictorially, 3 staircase steps 4010, each of which is non-smooth, and having an internal structure as shown.

Figure 4B:
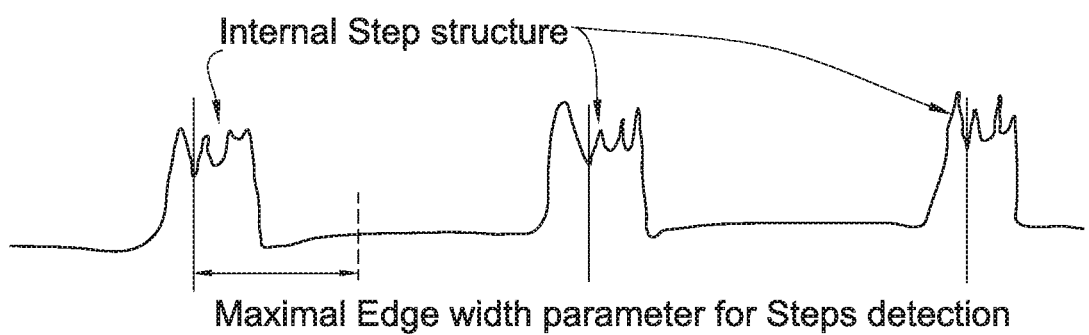

FIG. 4b shows the SEM signal corresponding to the steps of FIG. 402a. The maximal edge width parameter, for step detection, is shown as a distance between a first solid line on the left and a second dashed line on the right.

Figure 4C:
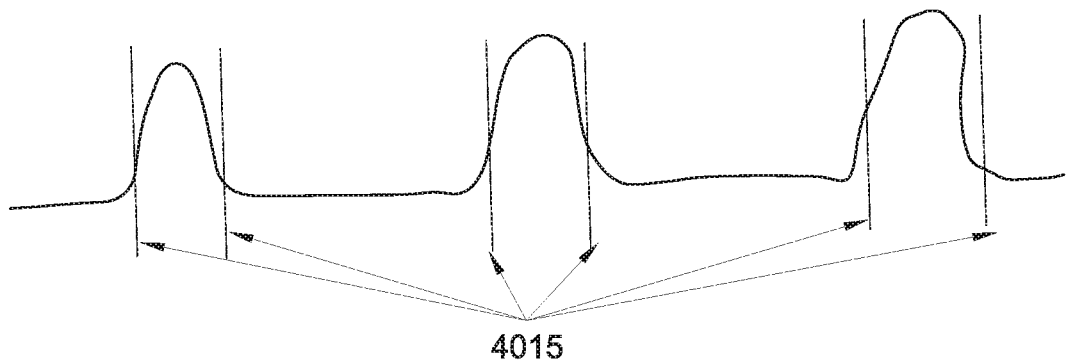

FIG. 4c shows coarse edges defining each step, typically one coarse edge per step. Note that a step to line transformation, e.g. as described herein, yields new coarse edges 4015, typically pairs thereof, same as for lines.

Figure 4D:
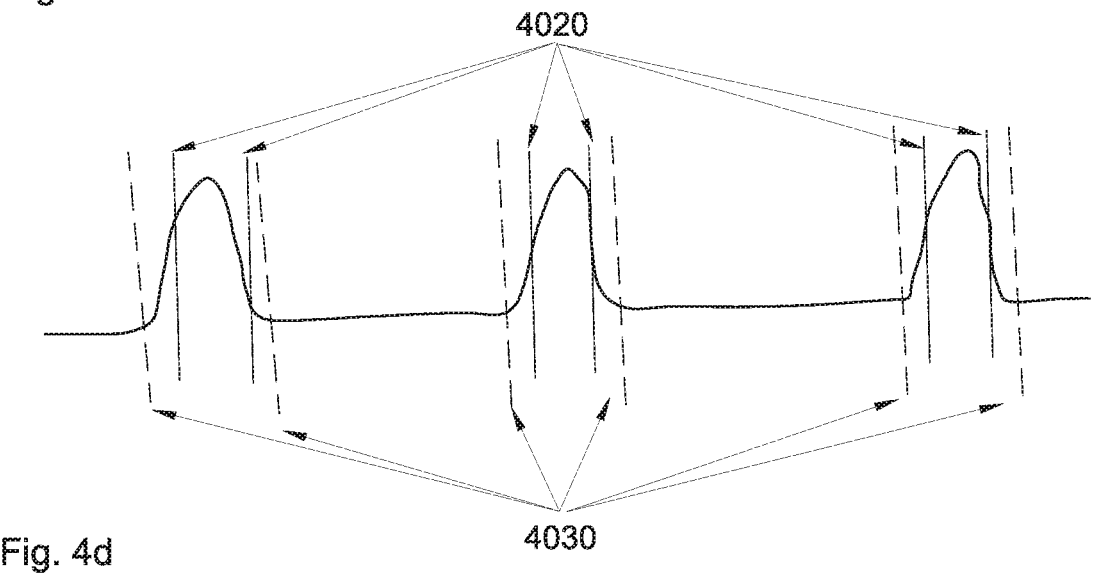

FIG. 4d shows coarse edges 4020, and pairs of fine edges 4030 defining left and right boundaries, respectively, of each step, which may be used for CD results.

Typically, the CD Results assume estimation of distance between two fine contours which may define a portion, say the leftmost or rightmost portion, of a Line or Step e.g. using straight line fit.

The method typically receives at least one SEM image, e.g. of a VNAND device including a 3D-NAND staircase having plural steps and contacts under the 3D-NAND staircase, e.g. as illustrated in FIG. 2a, image processes the SEM image, thereby to generate an image-processed algorithm input I; and runs a metrology algorithm on input I, thereby to measure at least one dimension of at least one line, even though the algorithm, which is designed for Line/Space structures, normally receives a conventional (non-VNAND) SEM image—rather than an image-processed input I representing a VNAND device e.g. 3D-NAND staircase.

According to certain embodiments, the line detection operation of FIG. 1a is operative to detect 3D Steps in 3D-NAND staircase target assuming number of 3D Steps is known. However, the method of FIG. 2a may determine a suitable anchor location e.g. the leftmost line in each 3D Step then use a CD SEM system (e.g. conventional 3D CD SEM metrology system) to measure distances of at least some steps from (say) the leftmost step on the SEM image of the 3D-NAND staircase. Then, these distances may be used for 3D-NAND staircase process control e.g. using one step (e.g. leftmost step) in a 3D-NAND staircase, as an anchor for parameterizing fabrication of other steps. An "ANCHOR" (e.g. leftmost step in the image of a 3D-NAND staircase) is useful because all measurements may be defined relative to the anchor, facilitating a consistent process control scheme, for upcoming stages of fabrication.

The method of FIG. 2a (aka Main flow for measurement of 3d features such as but not limited to 3D-NAND staircases), may include all or any subset of the following operations, suitably ordered e.g. as shown:

Operation a: Conventional Scanning by a conventional CD-SEM, thereby to generate an image (which may include a 3D-NAND staircase) for processing by operation b onward;

Operation b: in an image generated by operation a, detection and masking of type 1 contacts (closed curves which do not intersect lines).

Operation b may use the following flow, aka FLOW 1.

The Input of flow1 typically comprises a SEM image of the device containing Steps, provided in operation a, and, typically, Algorithm Parameters. Algorithm parameters may be provided by a User via a suitable GUI (Graphical User Interface). Suitable sets of parameters are generally described in in user manuals of a conventional CD SEM tool.

Flow1's Output typically comprises a Set of measurements from an Anchor (e.g. Leftmost Step) to N defined Steps.

Figure 5A:
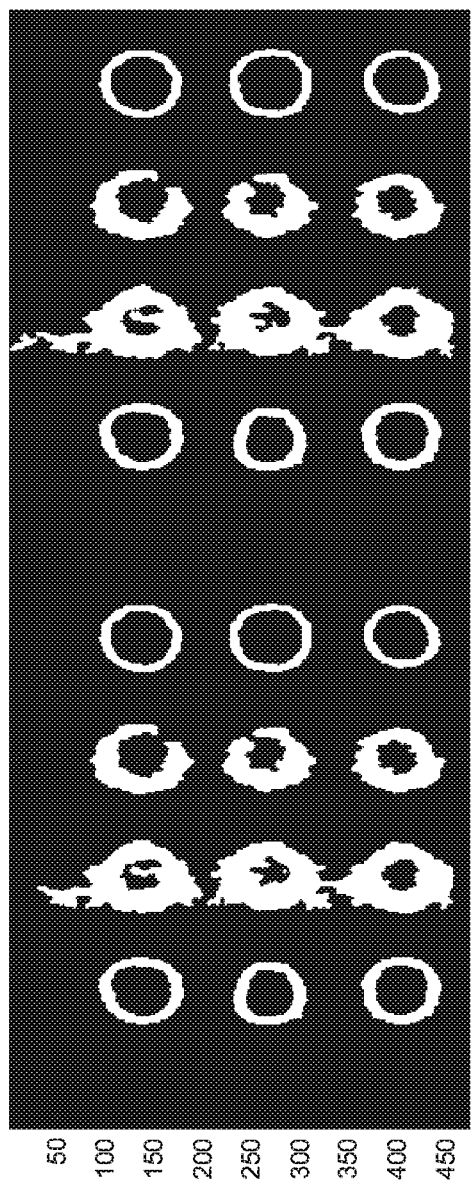
FIGS. 5a-5b are pictorial illustrations useful in understanding certain embodiments. In particular.

Flow1 may include operations AI and AII below, suitably ordered e.g. as shown:

Operation AI. Create contacts mask (e.g. as shown in FIG. 5a) which, e.g. based on conventional Segmentation algorithm, may detect a bright area in the image and may decide which bright areas are contact areas, and which are lines based on geometry. A suitable segmentation algorithm, which uses image processing techniques to identify steps in a SEM image is described in Ja. Vainberg, "Application of Markov chains to the problem of separation of Hole sections", Geologiya I Geofizika—Russian Geology and Geophysics, 1980 (2), p. 94.

Segmentation may include all or any subset of the following operations, suitably ordered e.g. as follows:

Operation s0: Receive as input a Gray Level Image (e.g. a SEM image including Edges and Background)

Operation s1. Estimates statistical properties of segment e.g. Average and Standard Deviation from Gray Level Histogram Operation s2. Estimate a priori probabilities that each pixel is a member of each segment Operation s3. estimate a posteriori probabilities of each pixel's being a member of each segment, e.g. using the Markov Chain technique Operation s4. Repeat operations s2-s3, in iterations, and, accordingly, generate a probabilities map—image where the value of each pixel is the final probability that pixel belongs to the segment Operation s5. Assign to each pixel segment a suitable number e.g. 1—background; 2—edges Operation s6: Typically, the number of iterations (and/or stopping criterion) is defined e.g. as external parameter/s. When iterations terminate, generate output including a segmented image, including for each pixel a label identifying one of plural (e.g. 2) Segment classes e.g. pixels may have either an index or label 1—denoting background or dark area, of the index or label may be 2 denoting an edge or bright area.

Figure 5B:
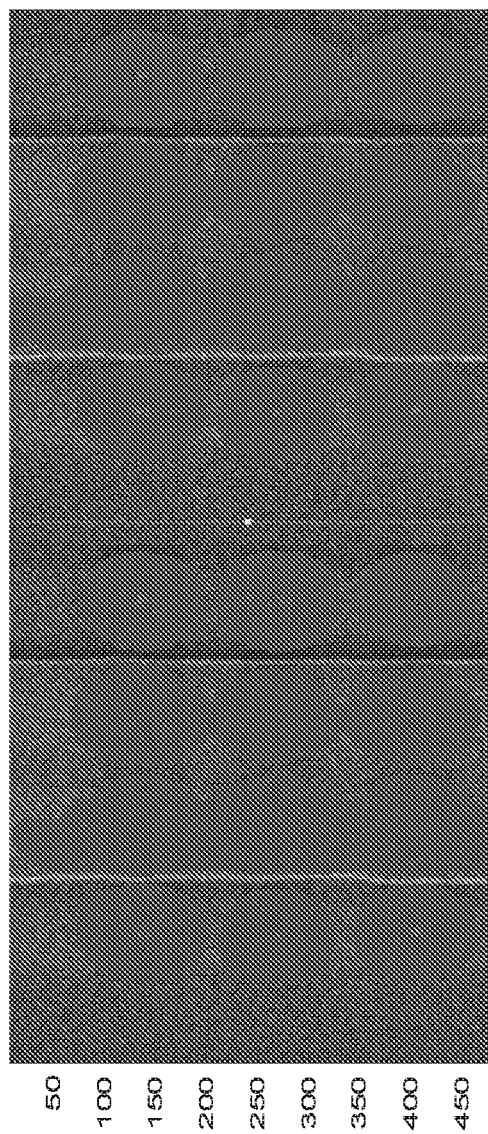

Operation AII (aka mask applying, e.g. as shown in FIG. 5b). Assign, to pixels inside mask, random grey level values which preserve image background statistics assuming generation of an image background area similar to the structure's desert (free from features) area, e.g. visually, where "image statistics" is intended to include average, standard deviation and/or other statistical characteristics such of image pixel/s inside mask area e.g. to be the same as inside the image's desert area. This operation ensures that the mask area does not affect detection of the Steps. Operation AII may include sub-operations b5, b6 described below.

Operation c: detection of steps in 3D-NAND staircase (which may include a variable or unknown number of steps) included in the SEM image generated in operation A.
This operation may include use of the LEA algorithm aka "line algorithm" known in the art e.g. as described in co-owned U.S. Pat. No. 9,165,376, the disclosure of which is hereby incorporated by reference.

The parameters of the LEA algorithm may be customized for 3D-NAND staircase Step detection since the LEA algorithm is designed for Line/Space rather than for Step device structure.

For example, a line detection algorithm, having a target and a MaximumEdgeWidth parameter, may be used, while defining:
target=3D-NAND staircase or step/s, and
MaximumEdgeWidth: =half of Minimal Distance between Steps (e.g. between any pair of steps in the target 3D-NAND staircase).

The line detection algorithm may be performed e.g. by techniques known in the art.

The output of this operation may include:
Coarse Edge—parameters of straight line located in the vicinity of Step;
and/or
Number of Coarse Edges found, which corresponds to the number of Steps.

Operation d: Step to line transformation
The Line is defined by Two Coarse edges aka the step's Left and Right edges.

According to certain embodiments, the "line detection—constant number of lines" operation of FIG. 1a is performed between operations d and e.

Operation e: Conventional Fine contour detection or estimation, using coarse contour identified in operation d as input.

Fine Contour defines the most accurate and precise location of real feature boundaries (e.g. boundaries of Steps), to be used for CD Measurements. conventional algorithms used in CD Metrology for Fine Contour definition are known in the art.

Operation f: Robust linear fit (for contacts type 2—portion of closed curve which intersects line) e.g. using flow b described herein.

Operation g: Provide CD results e.g. generate an output representing contour detection results generated in operation e. These CD results may be used for process control e.g. as known in the art.
It is appreciated that operations a, e, g may be conventional e.g. as shown in the same-captioned operations in FIG. 1a, respectively.

The method of FIG. 1b may for example employ a method for detecting a parameter (such as but not limited to feature edge, feature roughness, edge slope, feature height, feature material) of a pattern, which includes all or any subset of the following operations: obtaining an image of the pattern; the image typically generated by scanning the pattern with a charged particle beam; processing the image to yield an edge enhanced image; the processing typically including computing an aggregate energy of first n spectral components of the image e.g. by applying spectral functions on the image, wherein n may exceed two. The spectral functions may be selected according to a distribution of charged particles of the charged particle beam. The method may include further processing the edge enhanced image and determining a parameter of the pattern. This further processing may comprise detecting paths of the edge enhanced image including determining scores for multiple paths e.g. by repetitively performing the following sub-operations aa and bb:
aa. finding a best path by applying a dynamic programming process to identify a path with a highest current score, and
bb. mitigating an effect of the best path before finding a path with a new highest score.

It is appreciated that the method of FIG. 2a achieves transformation and customization of SEM images of 3D-NAND staircase structures to allow these 3D-NAND staircases to be treated as Line/Space structures including all conventional Line/Space measurements for process control, typically using an algorithm which is designed for Line/Space rather than for Step device structure, such as the LEA algorithm known in the art.

Typically, the image-processing of FIG. 2a (e.g. operations b, c, d) allows the "constant number" line detection operation of FIG. 1a to be called by or incorporated in the method of FIG. 2a.

Typically, the Robust Linear fit (e.g. FIG. 2a's operation f) also works for steps with type 2 contacts or for steps without contact. For Steps without Contacts, the Robust Linear fit typically yields the same results as does the Linear Fit operation of FIG. 1a.

The method of FIG. 2a may perform detection of a parameter of a pattern, including obtaining an image of the pattern by scanning the pattern with a charged particle beam; processing the image to provide an edge enhanced image; and further processing the edge enhanced image and determining a parameter of the pattern. This may include a stage 1110 of obtaining (receiving or generating) an image of a pattern. The image is generated by scanning the pattern with a charged particle beam such as an electron beam. The pattern can include multiple features such as lines that have a line width. The lines can be close to each other by a distance that is not much bigger than the width of the charged particle beam (when impinging on the pattern). The distance can be smaller than the width of the charged particle beam. The line width can be smaller than the width of the charged particle beam or slightly bigger than the latter.

Stage 1120 may include finding the main direction of the edges of the pattern. Stage 1120 may include finding edges of the image and then finding the main direction of these edges, for example by averaging directional information about the edges.

Stage 1130 may include processing the image to provide an edge enhanced image. Stage 1130 may include stage 1140 of computing the aggregate energy of first n spectral components of the image, wherein n exceeds two. Stage 1140 may include stage 1141 of processing the image by applying a n'th order polynomial filter on the image, wherein n exceeds two. Stage 1140 may include stage 1142 of computing the aggregate energy by applying spectral functions on the image, wherein the spectral functions are selected according to a distribution of charged particles in the charged particle beam. They may be selected to allow a reconstruction of the edge. The spectral functions may be discrete orthonormal functions.

Stage 1140, which may include stage 1144 of applying the n'th order polynomial filter, is responsive to the main direction. Stage 1144 can include applying the n'th order polynomial filter at a direction that is substantially normal to the main direction. Stage 1144 can also include applying an averaging function at a direction that is substantially parallel to the main direction.

Stage 1150 of finding edges of the pattern by detecting paths in the edge enhanced image, may be performed. Stage 1150 can include stage 1152 of applying a dynamic programming process. Stage 1150 can include stage 1154 of applying a dynamic programming process that is responsive to a main direction of edges of the pattern. Stage 1150 can include stage 1156 of applying a dynamic programming process with blocking Stage 1156 can include detecting paths of the edge enhanced image by repetitively finding a best path by applying a dynamic programming process, and mitigating an effect of the best path before finding a next best path.

Stage 1160 may include stage 1162 of clustering paths according to a score associated with each path and ignoring some paths, based on their scores. Stage 1160 may include stage 1164 of ignoring paths that belong to a lowest score cluster. Stage 1160 may include stage 1166 of clustering the paths so that a largest difference between any scores of paths that belong to a same cluster is smaller than any difference between scores of paths that belong to different clusters.

Stage 1170 of generating edge information that is responsive to verified paths may include generating an image but this is not necessarily so. Stage 1170 can include generating an output image that includes edges that were verified during stage 1160 and does not include edges that should have been ignored, according to stage 1160. The edge information can be processed to provide metrology information such as critical dimensions of the features of the pattern.

FIG. 2a's Operation b may include all or any subset of the following sub-operations b1-b6, suitably ordered e.g. as shown:

b1 Image segmentation: Input SEM image; then processing to assign to each pixel a label e.g. 1—background; 2—Feature Edge.

b2. Blob detection: conventional detection of connected regions with index (or label) of 2.

b3. conventional estimation of a Blob Bounding box (e.g. to circumscribe or include the connected regions)

b4. detection of type 1 contacts e.g. by detecting blobs whose bounding box size is smaller than image height. Typically, the Steps and Contacts belong to Segment 2 corresponding to the bright image area. Typically, it is desired to create a mask for contacts only. The difference between blobs of Segment 2 corresponding to the steps and contacts, is typically the geometric parameters of blobs such as height of their bounding boxes. This parameter may be used for creating of subset of segment 2 corresponding to the contacts Type 1 only. This subset typically defines the Contacts mask used for further Contact masking operation.

b5. Background statistics estimation: e.g. estimation of Average Gray Level (Mean) and Standard Deviation (STD) for pixels with index (or label) 1.

b6—Masking: Gray level in pixels defined in sub-operation b4 as type 1 Contact pixels, is replaced with random noise having the mean and standard estimated in sub-operation b5.

In performing FIG. 2a's operation d, the following sub-operations d-I to d-iv may be employed to create two coarse edges (indicated in FIG. 2b by dashed lines), corresponding to the leftmost and rightmost portions of the Step, from SEM image and one coarse edge; note the step found in operation c is defined by one coarse edge.

Sub-Operation d-I. Input SEM image+list of Coarse Edges respectively corresponding to Steps Sub-Operation d-II. Crop image around Each Coarse Edge Step Sub-Operation d-III. Remove internal Step Structure e.g. using conventional image processing techniques as known in the art, such as, say, the morphological operation of dilation. The result of this operation typically includes removal of signal deviations between portions, e.g. leftmost and rightmost portions, of at least one step.

Sub-Operation d-IV. Define leftmost and rightmost portions of Step Signal without Internal Structure as respective Coarse Edges.

Thus, FIG. 2a's operation d typically yields Two Coarse Edges per Step which facilitates use of a standard flow e.g. LEA algorithm which assumes Two Coarse Edges per Line (such as the line detection operation of FIGS. 1a and 1b).

FIG. 2a's Operation f includes using robust fit to find a linear model. This may include all or any subset of the sub-operations included in the following flow2, suitably ordered e.g. as follows:

Flow 2: Use Robust Fit to Find Linear Model

Flow 2's Input typically comprises a Set of points {x_i, y_i} defining fine contour and/or parameters of robust fit algorithm.

Flow 2 is typically configured to use Robust Fit to find linear model (ax+b) that best fits contour (e.g. Topopoints aka Topography Points—indicated as black dots in FIGS. 2a and 2b) such that real line points, or contact points which intersect (are "glued to") lines, are not affected by Strong Systematic Outliers, where "Contour" is intended to include a set of points detected on the image which define a real feature boundary hence may be used for measurement. The Real Line points typically correspond to or define the boundary of a step and may be similar in shape to a straight line.

Sub-Operation f1. Receive a set of {x, y} points output by the LEA (Line Edge Analysis) algorithm.

{x,y} points represent the output of the Fine Contour stage of LEA algorithm, used here for Robust Fit estimation of linear fit (e.g. to replace the linear fit conventionally used in LEA).

Thus (x,y) are typically included in the output of the {Fine Contour detection} operation in FIG. 2a.

Sub-Operation f2. Build a linear Model y=M(x)=ax+b+noise(x) by estimating which a, b are the argmin of F (which a,b, when input to F, cause F to be as small as possible).
Where F is a sum of weights: F(a, b)=$\Sigma_i$W(a, b, {x(i), y(i)})
Thus, a Minimization algorithm or process is performed, to yield a, b which minimize the sum, F, of weights.

One method for determining a, b which are the argmin of F, is described below in Flow 3.

Typically, this estimation uses a Robust fit (rather than using Least Squares which is vulnerable to even a few outliers) with suitable weights w assigned to (e.g. whose values are estimated at) each point x, y in the set of {x, y} points output by the LEA algorithm.

Where W is typically a non-convex function e.g. Welsch weight function at point {x,y} may be:

$$\text{Welsch weight function } (a, b) =$$
$$\text{argmin } F(a, b) = \sum_i \left(1 - \exp\left(-\frac{(ax(i) + b - y(i))^2}{\sigma^2}\right)\right).$$

Thus, typically although not necessarily, use $$W(a, b, \{x, y\}) = 1 - \exp\left(-\frac{(ax + b - y)^2}{\sigma^2}\right)$$

as the Weight function for point {x,y}.

It is appreciated that a rectangular approximation of the Welsch function may be employed. For example, the Welsch function may be approximated using a rectangle or strip whose centerline is line ax+b. The strip width may be plus/minus 3 (say) standard deviations (aka std's) wide. The term "standard deviation" refers to the standard deviation of the distance from point {x_i, y_i} to line y=a*x+b at fixed a,b (since this distance is a random variable).

Each point in the strip has a value of 0; each point outside the strip has a value of 1.

To minimize F, search for the 3 std-wide strip which has the most points inside (e.g. has more points inside, than all other 3 sd-wide strips).

Flow 2's Output typically includes {a,b}—Parameters of linear fit y=ax+b.

One method, aka flow3, for determining a, b which are the argmin of F, is now described:

Flow 3. Solve Optimization Problem: Minimize F(x) Subject to x̌≤x≤x̂

Flow 3's Input typically includes a Set of points {x_i, y_i} defining a fine contour, and/or parameters for robust fit algorithm which may be provided by the user. These parameters typically define respective technical implementation aspects of an optimization process. of function F(a,b) e.g. as defined hereinabove.

Flow 3 thus refers to minimizing F, within certain minimal and maximal limit of x which may be defined by the end-user.

1$^{st}$ Stage of Flow 3—Aka Statistical Stage

A genetic algorithm to generate a population of solutions to the above optimization problem may be used, that is close enough to local extrema of a target function (e.g. error of fitted model) of parameters (e.g. model parameters such as slope, offset—a and b respectively, in the linear model y=ax+b).

Generally, a genetic algorithm performs optimization by genetic selection, i.e. survives the candidates (e.g. candidate solutions) that are best in accordance with a (typically predetermined, conventional) bestness criterion. In terms of optimization, survivors are best (better than non-survivors) in terms of the target function.

The space (which includes the population of solutions) may be the polynomial parameters space (e.g. an (offset, slope) parameter space or a space having an a axis and a b axis, for linear model y=ax+b, where [a,b] is an ordered [slope,offset] pair).

The goal or criteria of this problem is to find a model having minimal error e.g.: for OLS (ordinary least square)—the sum of squared errors (which may be used as a reference); and the sum of error passed via Welsch function, if Welsch is used instead of least squares.

Results of a local search (which may for example use conventional "steepest descent" or "Newton" techniques) may be strongly dependent on the starting point (the input to the search). If the starting point is close to local minima, then the result that will be found is that local minima. However, the desire is typically to find global minima.

The genetic algorithm may include:
1. random initial population generation, thereby to generate an initial "current population"
2. plural (say, 5) iterations I (I=1 . . . 5) of refining the current population (the population generated in iteration I-1) typically including:
   a. crossover to produce new point from 2 existing ((parents)) as their linear combination including selection of best as survivors, typically followed by
   b. mutation of current population including selection of best as survivors, as a tool for search for best points.

Typically, if the population is large enough, refining will yield some points that are respectively close enough to big local minima. These can (each) be used as starting points for local searches, yielding several big local minima, one of which is likely to be a global minimum.

Local search may have functional stop criteria e.g.:
a. No over threshold changes in function value over several last iterations; and/or
b. No over threshold changes in optimal point location. and
c. Allocated amount of work that can be done (e.g. limit on number of iterations and/or on number of function evaluations etc.)

Typically, when both the above functional criterial a, b are fulfilled and/or when local search reaches maximum number of iterations or of function evaluation, the local search stops.

Alternatively, a Local searcher (e.g. suitable Matlab function) may be used which uses a point produced by OLS as its starting point. This point may be placed anywhere in the desert (area free of features) which is far enough (e.g. predeterminedly far e.g. above a predetermined minimal threshold distance) from global minima.

Example: A Matlab robustfit( ) function that implements iterative weighted least square (IWLS) may be employed. The starting point may be generated algorithmically rather than being supplied by a user. Given a set of point {x,y}, a model may e.g. as described above, pair [offset, slope] for linear model estimation. An initial model estimation $m_0$=OLS(x, y) may be computed. While not having convergence, the process may compute weight $w_i$=f($m_i$, x, y) as a function of current model and recompute model $m_{i+1}$=WLS (x, y, $w_i$); —e.g. by weighted least squares.

All or any subset of 3 rules (selection, crossover, mutation) may be used to create generation n from generation n-1, in stage1.

The 1$^{st}$ stage may for example include all or any subset of the following operations 110, 120, . . . , suitably ordered e.g. as follows:

Operation 110. Initial generation which may include selection from, e.g. random sampling of, an "acceptable parameters region".

Typically, prior knowledge is available re line orientation e.g. that the line is close to vertical (i.e. that the slope a of x=a*y+b is close to 0).

Note that lines are typically vertical hence fitting coordinates x+a*y+b rather than y=ax+b may allow more precise line estimation, preventing singularity.

To define an "acceptable parameters region", the lower and upper limits of the region may be defined (e.g. by end-user) as minimal/maximal slope of the line given the prior knowledge. Parameter b may be close to the Step location e.g. the vicinity of the Coarse Edge location defined above.

Operation 120. At least once, do Iteration I which employs all or any subset of three rules (selection, crossover, mutation) e.g. crossover, selection, mutation, selection, thereby to define an "iteration I population" which may be the input to the next iteration I+1.

Operation 130. when stopping criterion=true, define the iteration I population as "close enough" and go to stage 2. One suitable stopping criterion may be that F is no longer decreasing (e.g. F is decreasing less, in the current iteration I relative to earlier iterations (less than I), than F decreased in a previous iteration e.g. I−1 relative to earlier iterations (e.g. less than I−1) i.e. "diminishing returns", or F is decreasing less than a threshold amount).

2nd Stage of Flow 3—Local Search Solver

Use the "close enough" population generated in stage 1 as input (aka initial points) for a local search algorithm to further refine aka optimize the initial points. Any suitable local search algorithm may be employed e.g. as described here https://www.sciencedirect.com/topics/computer-science/local-search-algorithm. For example, if F is differentiable, a gradient based algorithm aka gradient descent may be used as a local solver aka local search algorithm, wherein, if F (sum of weights as defined above) is a non-differentiable function, a derivative free (aka gradient-free) solver may be used as the local solver.

Figure 6A:
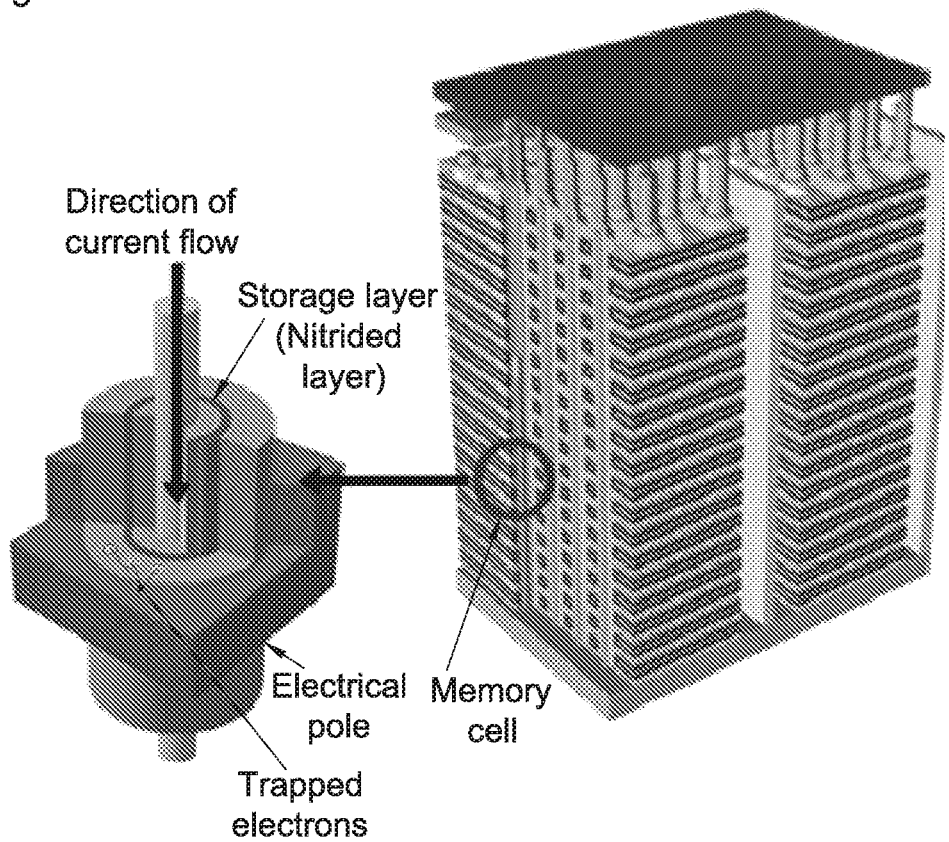
FIGS. 6a-6b are pictorial illustrations useful in understanding certain embodiments.
Figure 6B:
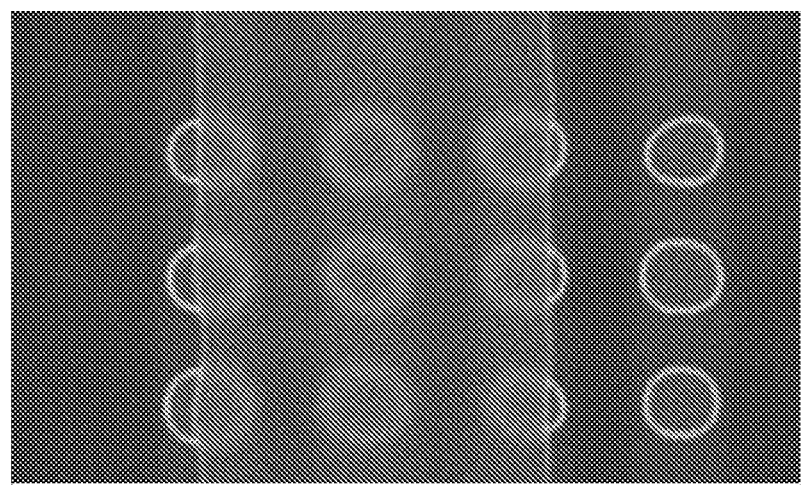

FIGS. 6a and 6b are simplified pictorial illustrations of a planar NAND flash.

FIGS. 6a and 6b are examples of a synthetic image.

Figure 7A:
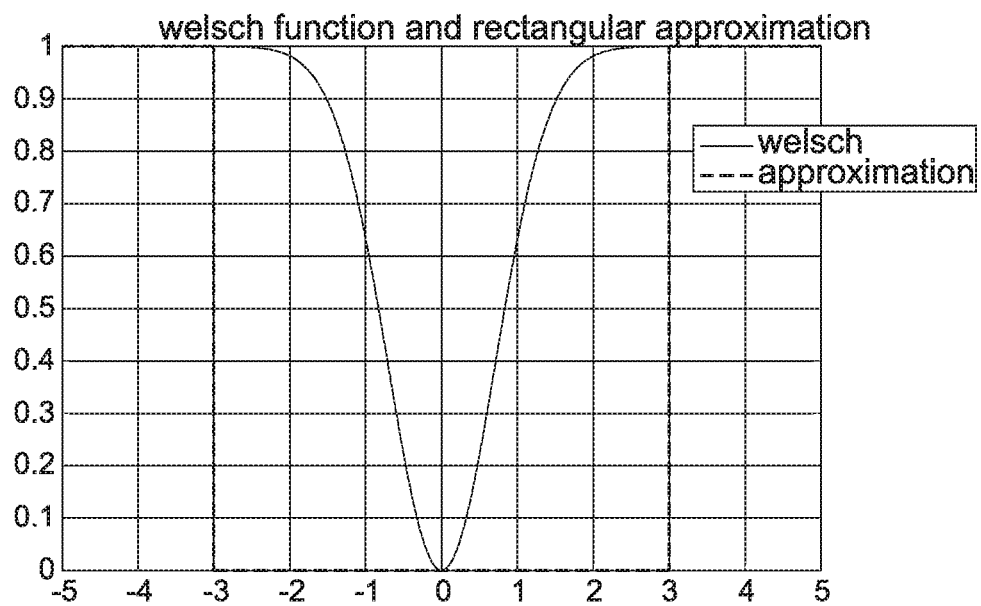
FIGS. 7a-7b and 8 are graphs useful in understanding certain embodiments.
Figure 7B:
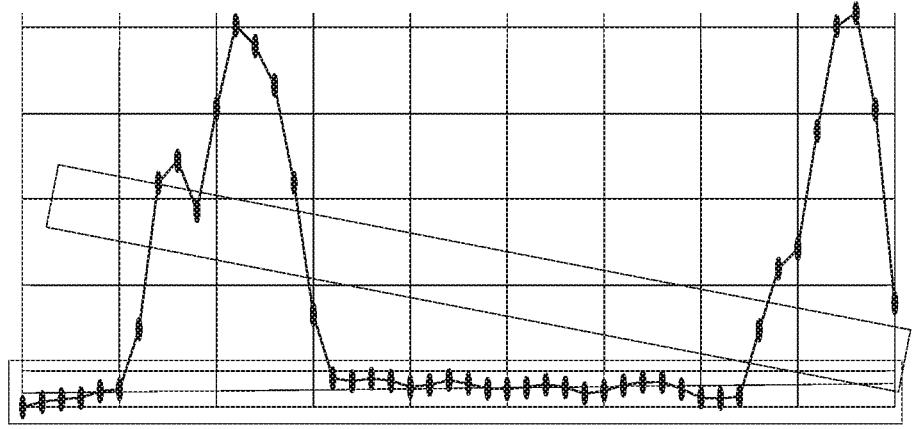

FIGS. 7a-7b are graphs useful in understanding an embodiment of the robust fit operation described above. According to an embodiment, the robust fit operation is operative to find (a, b) that minimize $$F(a,b)=\Sigma_i 1-\exp(-(ax(i)+b-y(i))^2/\sigma^2)$$

If a Welsch function is approximated by a rectangle, e.g. as shown, then each point inside ±3σ (say) strip has value 0 and each point outside the (say) ±3σ strip has value 1. The minimization of the function may be approximated by searching search for a strip of width ±3σ that includes maximal number of points inside. For example, in the graph of FIGS. 7a and 7b, the lower, horizontal rectangle has more points than the higher, diagonally oriented rectangle.

Figure 8:
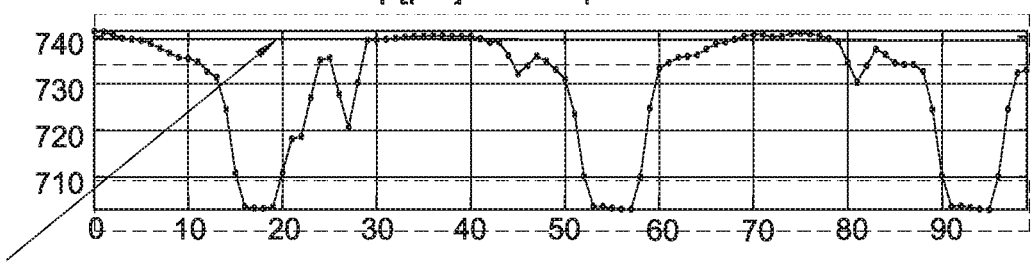

FIG. 8 is a graph of a multiple-line example of robust fit. As shown, the real line, shown at the bottom of the graph, passes through the bottom points however the number of points inside the top strip, indicated by an arrow, exceeds the than number of points inside the bottom strip, therefore, the line was drawn on the top.

A particular advantage of embodiments herein is sub-nanometer-level accuracy when measuring dimensions of (say) size or shape of 3D elements or devices, due to the miniscule size of the electron beam wavelength.

According to certain embodiments, CD SEM measurements are made traceable to the SI (System International d'Unites or International System of Units) definition of length using calibrated samples; these may be used (e.g. in process control) to compensate for sample-stage motions.

The Maximal Edge Width parameter described herein typically defines an area where another edge cannot be located. This parameter is useful for coarse edge algorithms. A coarse edge algorithm may include all or any subset of the following operations, suitably ordered e.g. as follows: find the strongest edge in the image; eliminate area in image around the strongest edge as found; find the second strongest edge, and so on, e.g. until all edges are found. Step detection typically includes finding a strongest step, eliminating the area around the strongest step as found and finding the next step, and so on, e.g. until all steps are found. The coarse edge algorithm e.g. as above, may be followed e.g. as described herein, by a fine edge algorithm which may use the coarse edge locations e.g. as found above, for definition of an area where a fine edge is located and estimation of the fine edge e.g. as described in chapter 33 referred to herein.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

Unless specifically stated otherwise, as apparent from the following discussions, it is appreciated that throughout the specification discussions utilizing terms such as "processing", "computing", "representing", "comparing", "generating", "training", "segmenting", "registering" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, a FPEI system and respective parts thereof disclosed in the present application.

The terms "memory" and "storage" used herein are intended to include any volatile or non-volatile computer memory suitable to the presently disclosed subject matter.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Each element of the invention described herein may have all attributes described or illustrated herein or according to other embodiments, may have any subset of the attributes described herein.

The terms processor or controller or module or logic as used herein are intended to include computer microprocessors which typically have digital memory and processing capacity, such as those available from, say Intel and Advanced Micro Devices (AMD), and any operation or functionality or computation or logic described herein may be implemented entirely or in any part on any suitable circuitry including any such computer microprocessor/s as well as in firmware or in hardware or any combination thereof.

It is appreciated that elements illustrated in more than one drawing, and/or elements in the written description, may still be combined into a single embodiment, except if otherwise specifically clarified herewithin.

It is appreciated that any features, properties, logic, modules, blocks, operations or functionalities described herein which are, for clarity, described in the context of separate embodiments, may also be provided in combination in a single embodiment except where the specification or general knowledge specifically indicates that certain teachings are mutually contradictory and cannot be combined. Any of the systems shown and described herein may be used to implement or may be combined with, any of the operations or methods shown and described herein.

Conversely, any modules, blocks, operations or functionalities described herein, which are, for brevity, described in the context of a single embodiment, may also be provided separately or in any suitable sub-combination.

What is claimed is:

1. A method for process control of a semiconductor comprising a staircase structure, the method comprising:
   obtaining an image of the semiconductor structure indicative of at least two individual steps of the staircase structure; wherein the image is generated by scanning the semiconductor structure with a charged particle beam and collecting signals emanating from the semiconductor structure; and
   processing, by a hardware processor, the image to determine a parameter of the semiconductor structure,
   wherein said processing includes measuring one or more steps from among the at least two individual steps as an individual feature, wherein said measuring comprises detecting a step and transforming the step into a line, wherein said transforming comprises defining, for the detected step, a pair of coarse edges and a pair of fine edges, and wherein said processing comprises using said pair of coarse edges and said pair of fine edges.

2. The method of claim 1 wherein said detecting comprises, for each of the one or more steps, obtaining a maximal edge width parameter, wherein the maximal edge width parameter is indicative of boundaries of said step.

3. The method of claim 2 wherein the maximal edge width parameter is approximately equal to half of a minimal distance between a first coarse edge of a step and a second coarse step of the step.

4. The method of claim 1, further comprising:
   selecting a predetermined number of steps; and
   setting a coarse edge of one of the steps as an anchor location and measuring parameters of other steps relative to the anchor location.

5. The method of claim 1, further comprising creating a mask for contacts in the image by (1) segmenting the image to locate the contacts and (2) associating the contacts with grey level values representative of an image background.

6. A non-transitory computer readable medium comprising instructions that, when executed by a processor, cause the processor to perform operations for process control of a semiconductor structure comprising a staircase structure, the operations comprising:
   obtaining an image of the semiconductor structure indicative of at least two individual steps of the staircase structure; wherein the image is generated by scanning the semiconductor structure with a charged particle beam and collecting signals emanating from the semiconductor structure; and
   processing the image to determine a parameter of the semiconductor structure,
   wherein said processing includes measuring one or more steps from among the at least two individual steps as an individual feature, wherein said measuring comprises detecting a step and transforming the step into a line, wherein said transforming comprises defining, for the detected step, a pair of coarse edges and a pair of fine edges, and wherein said processing comprises using said pair of coarse edges and said pair of fine edges.

7. A system, connectable to or hosted by a Charged Particle Microscope (CPM), for process control of a semiconductor structure comprising a staircase structure, comprising:
   a memory; and
   a processor, operatively coupled with the memory, to:
   receive an image of the semiconductor structure indicative of at least two individual steps of the staircase structure; wherein the image is obtained by the CPM and generated by scanning the semiconductor structure with a charged particle beam and collecting signals emanating from the semiconductor structure; and
   process the image to determine a parameter of the semiconductor structure, by measuring one or more steps from among the at least two individual steps as an individual feature, wherein said measuring comprises detecting a step and transforming the step into a line, wherein said transforming comprises defining, for the detected step, a pair of coarse edges and a pair of fine edges, and wherein said processing comprises using said pair of coarse edges and said pair of fine edges.

8. The system of claim 7, wherein the processor is further configured to perform operations comprising:
   detecting a step by, for each of the one or more steps, obtaining a maximal edge width parameter, wherein the maximal edge width parameter is indicative of boundaries of said step.

9. The system of claim 8, wherein the maximal edge width parameter is approximately equal to half of a minimal distance between a first coarse edge of a step and a second coarse step of a nearing step.

10. The system of claim 7, wherein the processor is further configured to perform operations comprising:
    select a predetermined number of steps;
    set a coarse edge of one of the steps as anchor location; and
    measure parameters of other steps relative to the anchor location.

11. The system of claim 7, wherein the processor is further configured to:
    creating a mask for contacts in the image by (1) segmenting the image to locate the contacts and (2) associating the contacts with grey level values representative of an image background.

* * * * *